United States Patent [19]
Dahy et al.

[11] 4,161,025
[45] Jul. 10, 1979

[54] INFORMATION PROCESSING SYSTEM

[75] Inventors: Jean-Jacques Dahy, Aubergenville; Maurice Hubert, Versailles, both of France

[73] Assignee: Compagnie Internationale pour l'Informatique, Louveciennes, France

[21] Appl. No.: 786,895

[22] Filed: Apr. 12, 1977

Related U.S. Application Data

[63] Continuation of Ser. No. 525,638, Nov. 20, 1974, abandoned.

[30] Foreign Application Priority Data

Dec. 4, 1973 [FR] France .................. 73 43137

[51] Int. Cl.² .................................................. G06F 3/04
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 4,017,841 | 4/1977 | Jensen | 340/172.5 |
| 4,038,644 | 7/1977 | Duke et al. | 364/900 |

*Primary Examiner*—Gareth D. Shaw
*Assistant Examiner*—C. T. Bartz
*Attorney, Agent, or Firm*—Kemon & Estabrook

[57] ABSTRACT

The invention describes an interface device for controlling data exchanges between a central unit and a plurality of satellite units each having an operative cycle of its own, without any chronometric relation imposed to the said units. Said interface device comprises an addressable arrangement memorizing a record of the timed sequence of the steps of each one of the operative cycles of the satellite units and an executer circuit which, on request from the central unit, sequentially scans the record of the operative cycle of the addressed satellite unit and applies to a command input of the said unit the actuation commands derived therefrom at an asynchronous timing of the steps of the said operative cycle record.

3 Claims, 1 Drawing Figure

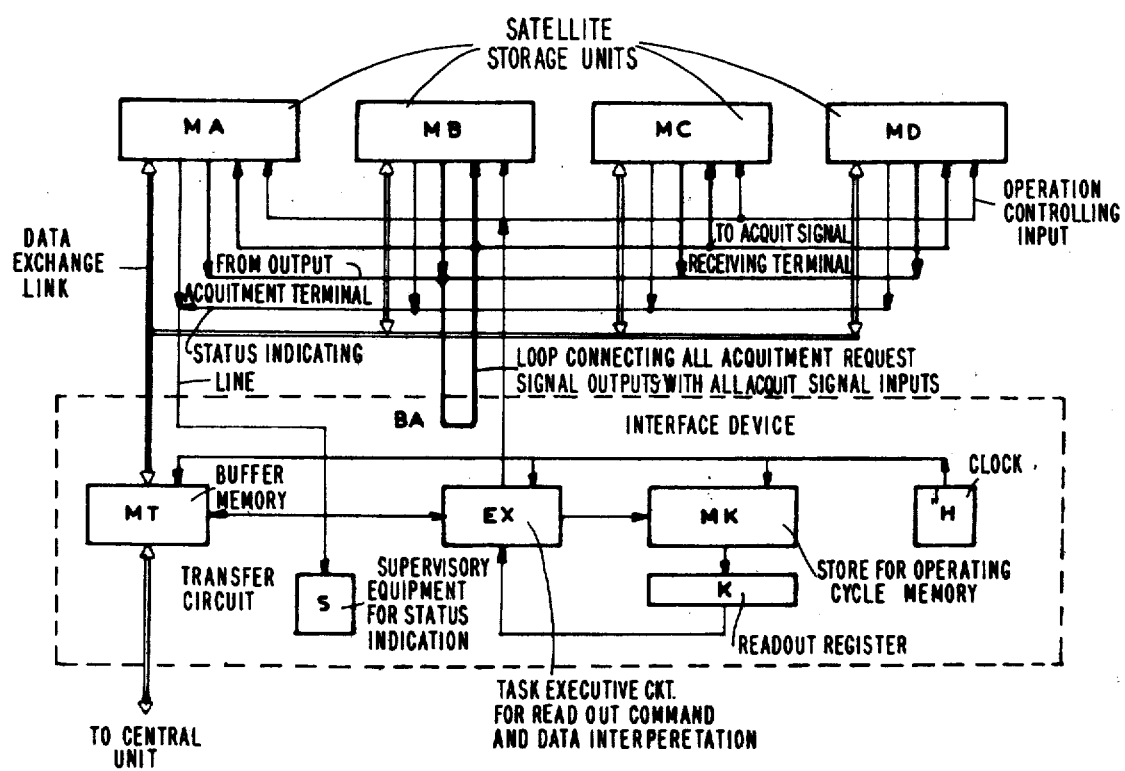

INFORMATION PROCESSING SYSTEM

This is a continuation, of application Ser. No. 525,638, filed Nov. 20, 1974, now abandoned.

BRIEF SUMMARY OF THE INVENTION

The present invention concerns improvements in or relating to an interface device adapted for controlling data exchanges between a central unit and external or satellite units in an information processing system wherein each one of the units operates with a chronometry of its own and according to its own operative cycle for execution of a task.

In a processing system of this kind, when the central unit wishes a data exchange with a satellite unit or when a satellite unit requests a data exchange with the central unit, a request to which said central unit is agreeable, it was usual to have recourse to the use of so-called unifiers buffering the exchanged information and unifying the chronometries of the data exchanging units during such an exchange task.

It is an object of the invention to provide a data exchange controlling interface device which avoids such a recourse and moreover is adapted to handle a plurality of possible exchanges between such a central unit and a plurality of satellite units having diversified chronometric operative cycles.

It is a further object of the invention to so provide such a data exchange controlling interface device that it automatically commands the satellite unit addressed in an exchange request it receives from the central unit without any necessity of two-way command communications between it and the controlled unit.

In conventional processing systems, each satellite unit comprises an addressable cycle execution control input, an acquitment request output activated at each termination of execution of an operative step of its cycle and an acquit signal input which, when activated, authorizes the unit to proceed to the next step execution in its operative cycle.

According to a feature of the invention, a data exchange controlling interface device comprises an addressable arrangement memorizing a record of the timed sequence of the steps of each one of the satellite units it will control and an executive circuit activable to scan an addressed one of the said records and generate and send the appropriate commands at the appropriate times to the addressable cycle execution control input of the satellite unit in an automatic sequence, and a galvanic loop connecting all the acquitment request outputs of the satellite units to their acquit signal inputs.

BRIEF DESCRIPTION OF THE DRAWINGS

The single FIGURE of the attached drawings shows an exemplary embodiment of a device according to the present invention, wherein only the useful components are shown, each one in a block representation as being each of conventional technological execution per se.

DETAILED DESCRIPTION

In the drawings, the four blocks MA, MB, MC and MD illustratively represent four storage units which, through a buffer memory MT must be capable of data exchange with a central unit, not shown, having a two-way communication link to said buffer store. Each of the said storage units also presents a two-way communication link to said buffer store. In the drawings, such data exchange communication links are shown in double lines whereas any functional connection is shown represented by a single line even if it comprises several conductors. It must be understood that the invention is not limited to its application to the cycle control of storage units.

Associated to each block are shown two input connections and two output connections. Starting from the right-hand side, the first input connection is an operation controlling input for the operation of the store, the second input connection is connected to an acquit signal receiving terminal of the store, the first output connection is connected to an output acquitment request terminal of the store. The second one of said output connections merely consists in a status indicating line connected to a supervising equipment S shown within the interface device in an exemplary illustration but which is not imperative and may be placed at an other location in the system.

The buffer store MT is not imperative and may be restricted to a mere assembly of two-way signal routing gates. Whether a buffer store or a gate assembly, said component MT is two-way connected to an input/output terminal of a task executive circuit EX associated to a store arrangement MK according to an organization which will be hereinbelow described. Said executive circuit EX is provided with an output connected to the input control connections of the storage units MA to MD.

The task executive circuit EX, the store MK and the MT components are clocked from a clock H imposing a local chronometry to the device.

The operative cycles of the satellite units MA to MD are assumed distinct. Each one is the subject of a record stored in a sector of the store MK. To said store MK is associated a readout register K the content of which is applied, at each read-out controlled from the executive circuit EX, to this circuit EX. The components EX, MK and K are consequently interconnected in a conventional fashion as they together constitute an automatic address progression command store unit. When the executive circuit EX is activated from the reception of an operation code requesting a particular task to be executed in such a unit, said operation code being supplied from the central unit through the MT component, an internal logic organization of EX generates the first store address at which a first command word of a sequence of a number of words defined in said operation code is stored in MK. Then EX controls a read-out operation of the command word at this first address of MK. Said command word is loaded into the register K and the executive circuit EX analyses the content of said word, executes the command therein and generates the next following address of the sequence of command words, and so on up to the exhaustion of the said sequence. It then comes to rest until the reception of a new operation code.

In a device according to the invention, the selectable sequences of command words in the store MK respectively describe operative cycles of the satellite units. That is to say that each word read out from MK, or selected ones at least, includes in addition to the usual address modification code for generating the next address for the store in an automatic progression of the addresses, a command part containing two codes: one for defining the nature of the step of the operative cycle to be executed by the satellite unit, and one for defining the time instant when, in the operative cycle, such a step must be initiated. The executive circuit EX interprets the code of the nature of this step ang generates a control signal appropriate to be send to the satellite unit and it further interprets the code of the time instant whereat said step must be initiated, and consequently the time instant at which said control signal must be applied to the control input of the satellite unit. The interpretation of the code defining the time instant in the operative cycle of the satellite unit of initiating such a step is made within EX with the aid of a time basis circuit which receives the clocks H of the local chronometrye, which assumes that the chronometry of the satellite unit operative cycle has been translated into local chronometry or "time" in the record.

However, as known, a satellite unit can only proceed to a further step when it has received from the controller unit thereof, an acquitment signal for the previously executed step in its operative cycle. Each such unit consequently emits, at the end of execution of a step, an acquitment requesting signal.

An interface device according to the invention send the command signals for execution of the successive steps of a cycle at time intervals whereat any step is over. Consequently, it is provided that in such a device, a mere galvanic loop connecting all the acquitment request signal outputs of the satellite units to all the acquit signal receiving inputs of the said units, provides an automatic acquitment without loosing any superfluous time in two-way communications between the device and the satellite units.

To the command word store MK may be substituted records of the operative cycles within sets of registers and pulse counters. The nature of each step is set as a code in a register and the registers are automatically sequentially activated by the pulses issuing from said counters when passing to their maximum counts, each of which record a time interval for execution of a step of the operative cycle by the concerned satellite unit. With such an arrangement, the executer circuit EX has no more to generate progressive address codes and to interprete timing codes, since such items are hardwired in the records.

More definitely, considering that each operative cycle is recorded in the store MK as a microprogram necessitating N microinstructions to be successively executed by EX, thz following format of instructions may be used:

KAK—KφEX—KCS—KCT, wherein KAK is, as conventional, a data pointing to the store address wherein is recorded the next microinstruction to read-out, said data being applied to the address automatic progression forming circuit in EX,
wherein KφEX is, as conventional too, a data the interpretation of which in the executer unit EX will control the internal operation thereof for executing the type of operating generating the satellite unit command pointed at by the part KCS of the readout work and buffering the command resulting code within an output register of EX, and
wherein KCT is a code which, interpreted in the EX unit will determine the time instant at which said command buffer register will be read for sending the command to the satellite unit.

The KCS and KCT parts of a microprogram work in MK are, in a sequence defining an operative cycle of a satellite unit, varied from word to word to define the successive step commands S1, S2, . . . SN of the cycle whereas KCT defines the time instants T1, T2, . . . TN at which the commands must besend for execution in the satellite unit.

What is claimed is:

1. An interface device for controlling data exchanges through a data exchange link comprising a data exchange transfer circuit between a central processor unit and a plurality of individually selectable satellite units each of which operates according to an operative cycle of its own for execution of an exchange, each operative cycle of a satellite unit comprising a fixed plurality of sequential steps, each step being executed according to an internal chronometry of the satellite unit and the initiation of each successive step of the sequence being authorized from the reception after request of an acquit signal of the execution of the preceding step of the sequence by the satellite unit, each satellite unit having an input/output data connection to the said data exchange transfer circuit, an operative cycle control input controlling each time it is activated the execution of a corresponding step of the operative cycle of the satellite unit, an acquit signal requesting output activated each time an operative step of the cycle has been executed in the satellite unit and an acquit signal receiving input the activation of which authorizes the satellite unit to proceed to the execution of the next step of its operative cycle, said interface device comprising the combination of:
  means storing at locations thereof addressable from the central processor unit sequences of data, each sequence describing a step by step record of the operative cycle of a particular one of the satellite units and each data of the sequence describing the nature of the step to be executed by the satellite unit and the time instant at which the execution of this step may occur in the satellite unit,
  read-out data register means coupled to the said storage means to successively store the data words read out from said storage means,
  data read-out command and read-out data decoder means having a storage means address input activable by the central processor unit, a data input connected to the said read-out data register means, a satellite control signal delivering output connected to the operative cycle control inputs of the satellite units, and having a further output activated concurrently to the said satellite control signal and connected to an unblocking input of the said data exchange transfer circuit said data read-out command and read-out data decoder means further having a clock input,
  local clock means having an output connected to said clock input of the said data read-out command and data decoder means for defining the time instants at which the said satellite control signals are applied to the said satellite control signal delivering output and at which data are read-out from the said storing means, and,
  conductor means permanently connecting all acquit signal requesting outputs of the satellite units to all acquit signal receiving inputs of the said satellite units.

2. Interface device according to claim 1, wherein the said storage means consisting of an addressable microprogrammed multi-sequence store each word of a sequence describing both the nature of a step in an operative cycle of a satellite unit and the time instant in the cycle said step must be executed and wherein said data read-out command and read-out data decoder means comprise means for squentially incrementing the addresses of such words as they are read-out from the store, means for decoding the part of such a word defining nature of the step and means controlled from the said local clock to decode the time instant at which the decoded part of the word defining the nature of the step must be applied to the said satellite control signal delivering output.

3. Interface device according to claim 1, wherein said storage means comprises, for each record of a satellite unit operative cycle, as many registers as there are steps in a cycle, each one loaded with a code word descriptive of one of a step of the cycle and as many pulse counters of identical ranks fed by the said local clock means and each of a predetermined count, each output pulse from a counter activating the next one and reading out the corresponding rank code word register, and wherein said data read-out command and read-out data decoder means comprises a plurality of addressable sequence switches for controlling a sequential application of the pulses of the said local clock means to said counters, and the application of the decoded control signals from the read-out data register means to the said satellite control signal delivering output.

* * * * *